(12) United States Patent
Howell

(10) Patent No.: US 11,410,573 B2
(45) Date of Patent: Aug. 9, 2022

(54) WELDING GUIDE

(71) Applicant: Ryan Howell, Des Moines, IA (US)

(72) Inventor: Ryan Howell, Des Moines, IA (US)

(*) Notice: Subject to any disclaimer, the term of this patent is extended or adjusted under 35 U.S.C. 154(b) by 25 days.

(21) Appl. No.: 17/021,290

(22) Filed: Sep. 15, 2020

(65) Prior Publication Data
US 2021/0110738 A1 Apr. 15, 2021

Related U.S. Application Data

(60) Provisional application No. 62/912,917, filed on Oct. 9, 2019.

(51) Int. Cl.
*G09B 19/24* (2006.01)
*B23K 37/00* (2006.01)

(52) U.S. Cl.
CPC .............. *G09B 19/24* (2013.01); *B23K 37/00* (2013.01)

(58) Field of Classification Search
CPC .......... G09B 19/24; B23K 9/27; B23K 9/287; B23K 37/02; B23K 37/0205; B23K 37/0211
USPC .................................. 228/45; 219/124.31
See application file for complete search history.

(56) References Cited

U.S. PATENT DOCUMENTS

| | | | | |
|---|---|---|---|---|
| 1,505,106 A * | 8/1924 | Schroder | ............ | B23K 37/0205 266/66 |
| 1,991,128 A * | 2/1935 | Tripp | .............. | B23K 9/02 219/124.01 |
| 2,300,203 A * | 10/1942 | Edgarw | .............. | B23K 9/28 219/139 |
| 2,602,412 A * | 7/1952 | Gerlach | .............. | B23K 37/0205 228/25 |
| 3,201,561 A * | 8/1965 | Damon | .............. | B23K 37/02 219/124.31 |
| 3,573,425 A * | 4/1971 | Damon | .............. | B23K 9/02 219/124.31 |
| 3,581,049 A * | 5/1971 | Creith | .............. | B23K 9/02 219/124.31 |
| 3,698,701 A * | 10/1972 | Straub | .............. | B23K 37/0205 266/66 |
| 4,778,154 A * | 10/1988 | Cortez, Jr. | ......... | B23K 37/0205 266/66 |
| 5,391,857 A * | 2/1995 | Pompey | .............. | B23K 37/0211 219/124.31 |
| 2003/0047585 A1* | 3/2003 | McCombe | .............. | B23K 9/291 228/49.1 |
| 2007/0247571 A1* | 10/2007 | Smith | .............. | B23K 9/32 349/114 |
| 2014/0197149 A1* | 7/2014 | Ohta | .............. | B23K 7/00 219/138 |
| 2015/0158129 A1* | 6/2015 | Matthews | .............. | B23K 37/0294 219/138 |
| 2016/0332248 A1* | 11/2016 | Albrecht | .............. | B23K 37/0205 |
| 2017/0050273 A1* | 2/2017 | Ambring | .............. | B23K 9/287 |
| 2020/0238428 A1* | 7/2020 | Albrecht | .............. | B23K 9/28 |
| 2021/0178528 A1* | 6/2021 | Kloepfer | .............. | B23K 9/18 |

* cited by examiner

*Primary Examiner* — Robert J Utama
*Assistant Examiner* — Correll T French
(74) *Attorney, Agent, or Firm* — Zarley Law Firm, P.L.C.

(57) ABSTRACT

A welding guide has a plate having a first section and a second section that are bent along a bend line to form a right angle. Rollers are attached to the first and second sections and a positioning member having at least one aperture is attached to the second section. A top edge and a bottom edge of the first and second section have notches.

10 Claims, 2 Drawing Sheets

WELDING GUIDE

CROSS REFERENCE TO RELATED APPLICATIONS

This application claims the benefit of U.S. Provisional Application No. 62/912,917, filed Oct. 9, 2019, the contents of this application is hereby incorporated by reference in its entirety.

BACKGROUND OF THE INVENTION

The present invention is directed to a welding guide, and more particularly a welding guide used to teach welders proper principles and techniques.

Experienced welders use certain patterns and techniques to increase the cosmetic appearance of their weld. Customers often desire a particular weld appearance in specific industries. The typical learning curve for welders is more than a year to become adequate and consistent at welding. Even then, without proper instruction, welders may develop bad habits.

Accordingly, a need exists in the art for a welding guide that addresses these deficiencies.

An objective of the present invention is to provide a welding guide that provides consistency in creating certain welding patterns to increase the cosmetic appearance of a weld.

Another objective of the present invention is to provide a welding guide to enable untrained welders to create certain welding patterns, and use certain welding techniques, without years of training.

These and other objectives will be apparent to those having ordinary skill in the art based upon the following written description, drawings, and claims.

SUMMARY OF THE INVENTION

A welding guide has a plate with a first section and a second section that are bent along a bend line to form a right angle. Each section has a pair of spaced and aligned cut-outs that receive rollers. A positioning member is attached to the second section and has at least one aperture, and preferably has two apertures. The first section and the second section have an outer edge, a top edge, a bottom edge, an inner surface and an outer surface. The top edge and the bottom edge have notches at the bend line.

The positioning member preferably is attached to the outer surface, adjacent the outer edge of the second section and extends away from the second section at an angle that is either transverse or perpendicular. The positioning member has an inner edge connected to the second section, and opposite outer edge, and side edges. The apertures preferably are adjacent the outer edge of the positioning member.

DETAILED DESCRIPTION

Figure 1:
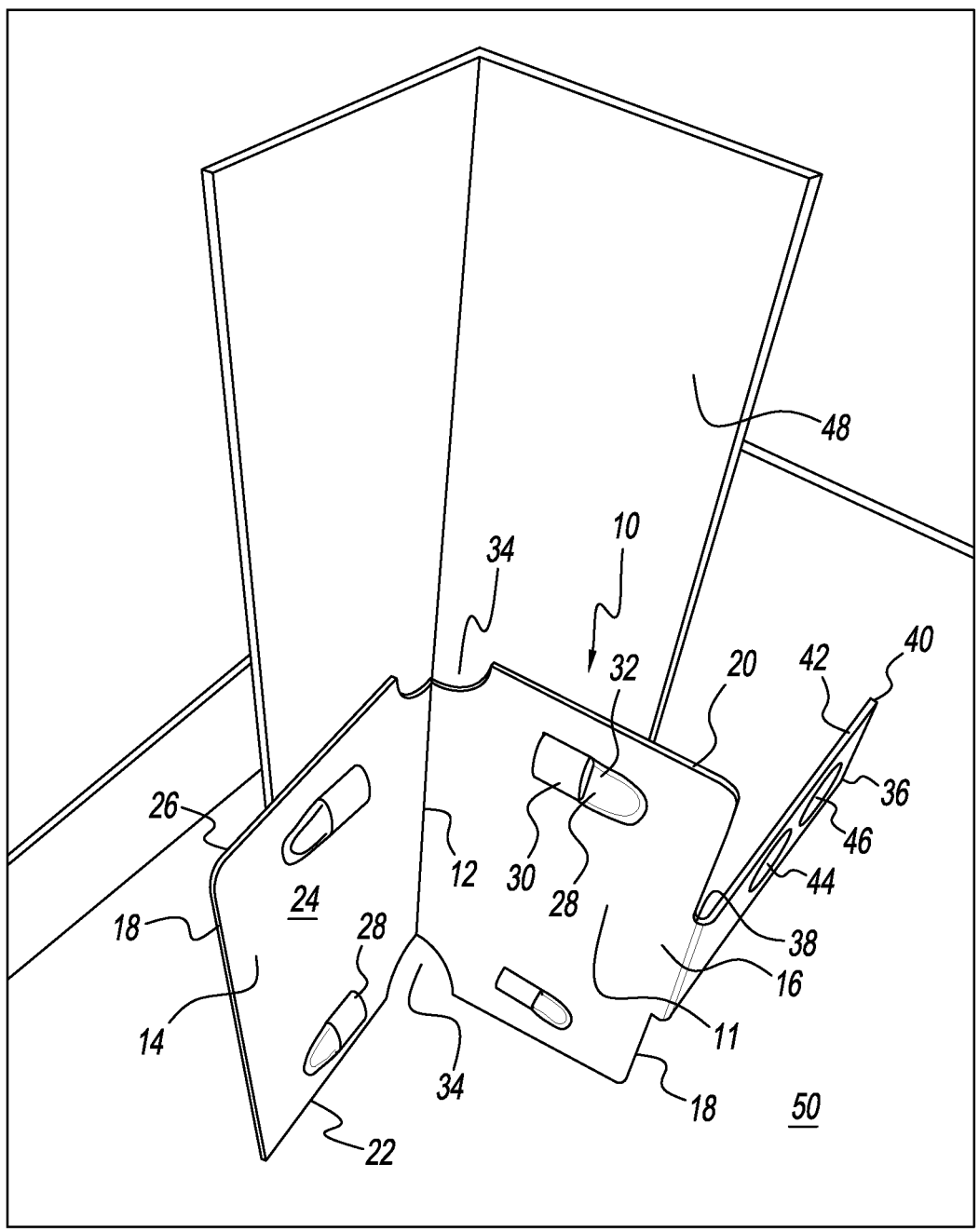
FIG. 1 is a perspective view of a welding guide.
Figure 2:
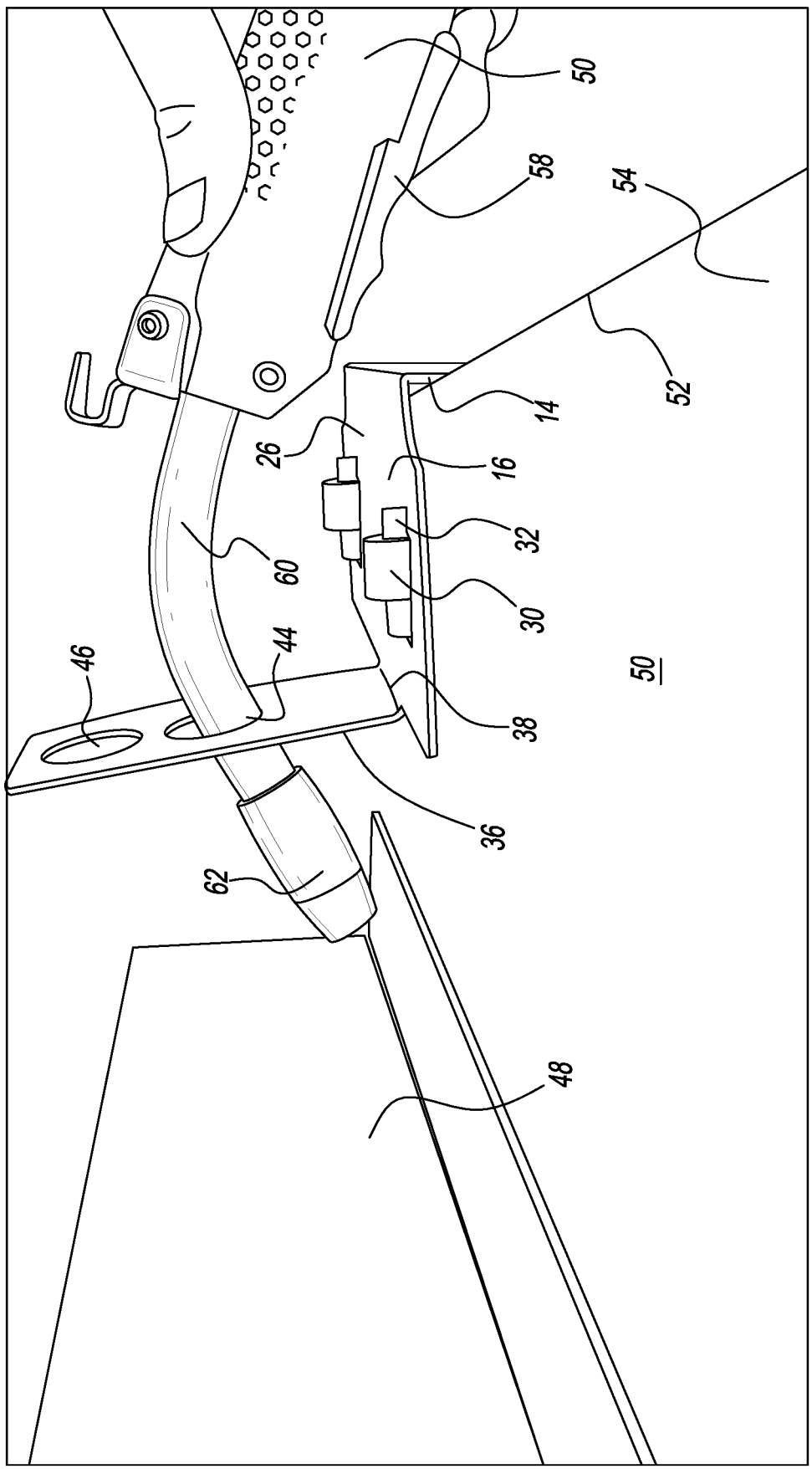
FIG. 2 is a perspective view of a welding guide.

Referring to the Figures, a welding guide 10 includes a plate 11, preferably made of metal that is bent along a bend line 12 to form a first section 14 and a second section 16 that are at right angles to one another. Both sections 14 and 16 have an outer edge 18, a top edge 20, a bottom edge 22, a first or inner surface 24 and a second or outer surface 26. Each section 14 and 16 also have a pair of spaced and aligned cut-outs 28. Received in each cut-out 28 is a roller 30 rotatably mounted to a shaft 32 that is connected to, or welded to, the outer surface 26 of each section 14 and 16.

Both the top edge 20 and bottom edge 22 have notches 34 at the bend line 12 of the plate 11. Also, attached to or welded to the outer surface 26 of the second section 16, adjacent the outer edge 18, is a positioning member 36 that extends transversely or perpendicularly to the second section 16.

The positioning member 36 has an inner edge 38 connected to or welded to the second section 26, and opposite outer edge 40, and side edges 42. The positioning member 36 also has a first aperture 44 adjacent the inner edge 38 and a second aperture 46 adjacent the outer edge 40.

In operation a work piece 48 is placed on a work bench 50 a working distance from an edge 52 of the work bench 50. The welding guide 10 is placed on the work bench 50 where the inner surface 24 of the second section 16 engages a top surface 54 of the work bench 50 in a generally horizontal plane and the inner surface 24 of the first section 14 engages the outer edge 52 of the work bench 50.

A welding lead or gun 56, having a trigger 58, gooseneck 60, and nozzle 62, is used to weld the work piece. More specifically, the nozzle 62 and gooseneck 60 are inserted through either the first or second aperture 44 or 46. The second aperture 46 is used primarily for industrial application. Using manual force, the welding guide 10, using the rollers 30, is rolled along the work bench 50 while a practitioner continues with the weld of the work piece 48.

Alternatively, for vertical welds directly at the corner of a work piece 48, the weld guide 10 is held against the work piece 48 so that the inner surface 24 of both the first and second sections 14 and 16 engage the work piece 48. The weld gun 56 is held so that the nozzle 62 is positioned adjacent one of the notches 34. The weld guide 10 can then be rolled along the work piece 48 to complete the weld.

From the above discussion and accompanying figures and claims it will be appreciated that the weld guide 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A welding guide comprising:
 a plate having a first section and a second section bent along a bend line at a right angle;
 rollers attached to the first section and the second section; and
 a positioning member having at least one aperture attached to the second section;
 wherein the positioning member is attached to an outer surface, adjacent an outer edge of the second section and extends away from the second section at an angle.

2. The guide of claim 1 wherein the at least one aperture is two apertures.

3. The guide of claim 1 wherein both the first section and the second section have an outer edge, a top edge, a bottom edge, an inner surface and an outer surface.

4. The guide of claim 1 wherein both the first section and the second section have a pair of spaced and aligned cut-outs that receive the rollers.

5. The guide of claim 3 wherein the top edge and the bottom edge have notches at the bend line of the plate.

6. The guide of claim 1 wherein the positioning member has an inner edge connected to the second section, an opposite outer edge, and side edges.

7. The guide of claim 1 wherein the at least one aperture is adjacent an outer edge of the positioning member.

8. A welding guide comprising:
a plate having a first section and a second section bent along a bend line;
rollers attached to the first section and the second section; and
a positioning member having at least one aperture attached to the second section;
the top edge and the bottom edge of the first section and second section have notches at the bend line of the plate.

9. A welding guide comprising:
a plate having a first section and a second section bent along a bend line;
a plurality of rollers attached to the first section and the second section; and
a positioning member having at least one aperture attached to the second section;
the first section and the second section having a pair of spaced and aligned cut-outs through an inner surface and an outer surface that receive the rollers within the cut-outs.

10. The guide of claim 9 wherein each of the plurality of rollers are rotatably connected to a shaft.

* * * * *